United States Patent [19]

Tecco

[11] 4,040,595
[45] Aug. 9, 1977

[54] INJECTION MOLDING MACHINE

[75] Inventor: Charles Tecco, Northfield Center, Ohio

[73] Assignee: Weatherchem Corporation, Twinsburg, Ohio

[21] Appl. No.: 712,589

[22] Filed: Aug. 9, 1976

[51] Int. Cl.² .......................... B29C 7/00; B29F 1/00
[52] U.S. Cl. ...................................... 249/68; 425/556; 425/588; 425/589; 425/436 R
[58] Field of Search ................. 425/242 R, 249, 468, 425/245, 247, 436, 441, 444, DIG. 5; 249/95, 105, 107, 66, 67, 68; 18/42 D

[56] References Cited

U.S. PATENT DOCUMENTS

| 2,253,651 | 8/1941 | Ring | 249/66 X |
|---|---|---|---|
| 2,687,157 | 8/1954 | Cowan | 264/242 X |
| 2,739,349 | 3/1956 | Strauss | 425/436 X |
| 2,778,533 | 1/1957 | Savary | 222/498 X |
| 2,875,472 | 3/1959 | Marcus | 249/68 |
| 3,013,308 | 12/1961 | Armour | 425/242 R X |
| 3,081,486 | 3/1963 | Skvorc | 425/436 X |
| 3,461,488 | 8/1969 | Croyle | 425/249 |
| 3,477,095 | 11/1969 | Lensky | 249/68 X |
| 3,537,676 | 11/1970 | Miller | 425/468 X |

Primary Examiner—J. Howard Flint, Jr.
Attorney, Agent, or Firm—McNenny, Pearne, Gordon, Gail, Dickinson & Schiller

[57] ABSTRACT

An injection molding machine includes a stationary mold half and a movable mold half. The stationary and movable mold halves cooperatively define a mold cavity for injection molding an end closure article having a base and a recloseable tab molded in an open position relative to the base. A thermoplastic material is injected into the mold cavity to form the end closure article. The movable mold half is then separated from the stationary mold half to open the mold cavity, and the tab of the end closure article is closed prior to ejecting the end closure article from the open mold cavity.

11 Claims, 11 Drawing Figures

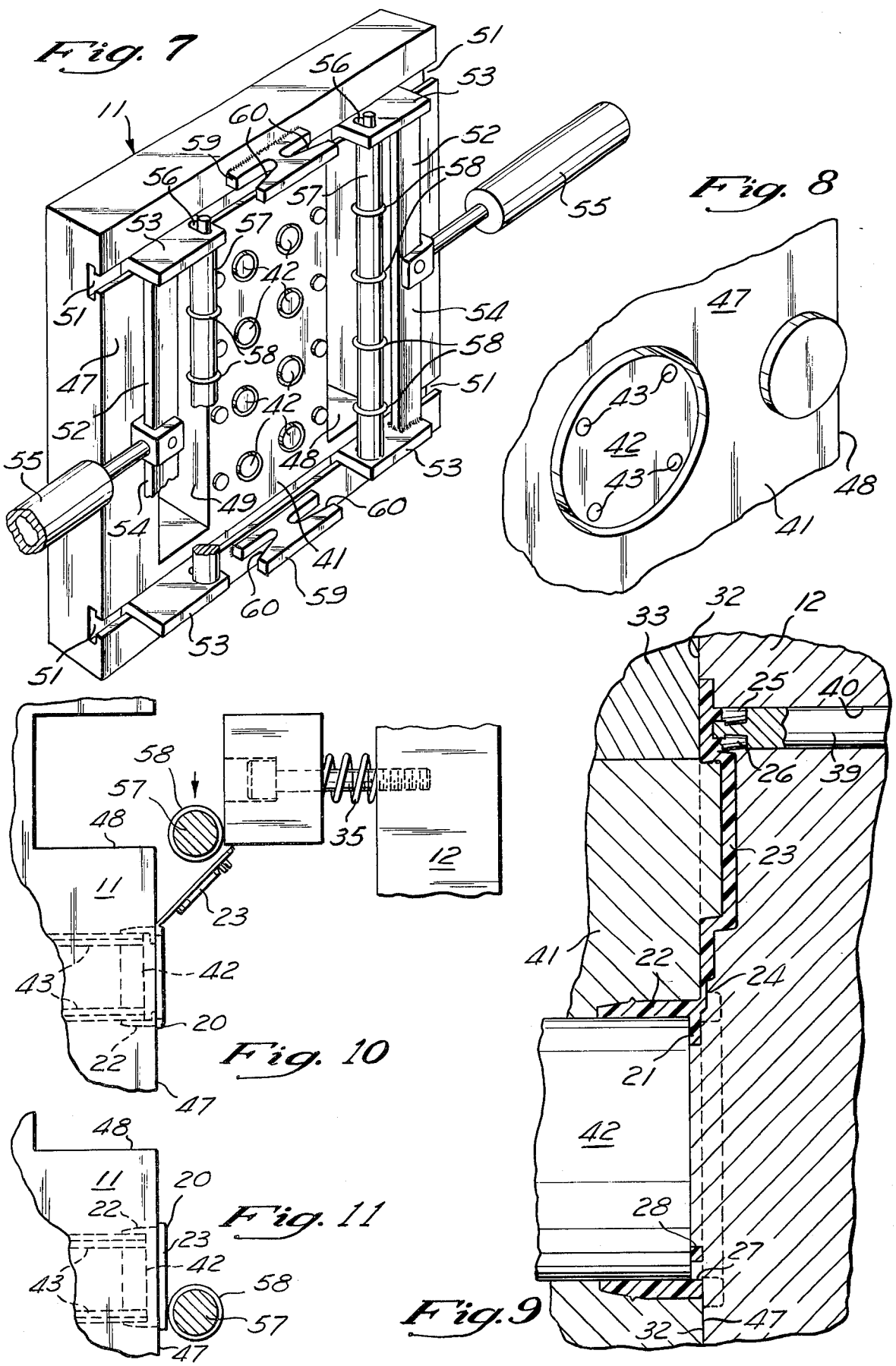

INJECTION MOLDING MACHINE

BACKGROUND AND SUMMARY OF THE INVENTION

The present invention relates to a machine for injection molding an end closure in which a recloseable tab of the end closure is molded in an open position and is subsequently rotated to its closed position before the end closure is ejected from the mold cavity.

Thermoplastic injection molding machines are commonly used for molding a one piece end closure in which the tab for closing the end closure is molded in an open position. One such machine is shown in U.S. Pat. No. 3,537,676. A disadvantage of these prior art machines is that it is necessary to close the recloseable tab of the end closure after the end closure is ejected from the mold. This necessitates an additional operation on the end closure after it is ejected from the mold.

The present invention departs from these and other prior art machines and methods by providing an injection molding machine having a stationary mold half and a movable mold half. The stationary and movable mold halves cooperatively define a mold cavity for an end closure article having a base and a recloseable tab disposed in an open position relative to the base. After the end closure article is molded, the mold is opened and the recloseable tab is moved to its fully closed position. The end closure article is then ejected from the open mold cavity and is ready for assembly on a container without requiring any further operations.

Further in accordance with the principles of the invention, the stationary mold half includes a tab lifter which engages a portion of the tab to rotate the tab from its open position as the movable mold half moves from a molding position adjacent the stationary mold half to an ejecting position spaced away from the stationary mold half. After the tab lifter moves the tab to a partially closed position, a tab closing roller engages the tab and further rotates the tab to its fully closed position. The end closure with the tab in its fully closed position is then ejected from the open mold cavity.

BRIEF DESCRIPTION OF THE DRAWINGS

These and other aspects and advantages of the present invention will be more readily understood upon an understanding of the preferred embodiment of the invention shown in the accompanying drawings, wherein;

FIG. 7 is a perspective view of the movable mold half for the machine shown in FIG. 1;

FIG. 8 is an enlarged perspective view of a portion of the movable mold half shown in FIG. 7;

FIG. 9 is a cross sectional side elevational view of a portion of the stationary mold half and movable mold half, with the movable mold half in the molding position and with the mold cavity filled with a thermoplastic material to form an end closure article;

FIG. 10 is a schematic side elevational view showing a tab lifter of the stationary mold half lifting the recloseable tab of the end closure article out of the movable mold half and rotating the tab to a partially closed position as the movable mold half moves away from the stationary mold half toward its ejecting position; and FIG. 11 is a view similar to FIG. 10 but showing the tab closing roller moving the recloseable tab to its fully closed position.

DETAILED DESCRIPTION OF THE DRAWINGS

Figure 1:
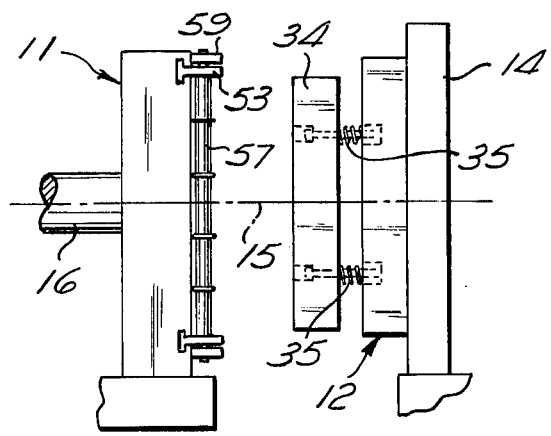
FIG. 1 is a partial side elevational view of an injection molding machine according to the principles of the invention.

Referring now to the drawings in greater detail, FIG. 1 shows a thermoplastic injection molding machine which includes a movable mold half 11 and a stationary mold half 12. The stationary mold half 12 is rigidly secured to a stationary platen 14 of the injection molding and does not reciprocate during the operation of the machine. The movable mold half 11 reciprocates along a longitudinal axis 15 of the machine by operation of a hydraulic ram 16. The movable mold half 11 is shown in its ejecting position in FIG. 1 away from the stationary mold half 12 for permitting the injection molded articles to be ejected from the movable mold half 11. The movable mold half 11 may be displaced by operation of the ram 16 to the right as viewed in FIG. 1 to a molding position adjacent the stationary mold half 12. The molding position is explained further below and is illustrated in FIG. 9 of the drawings.

Figure 3:
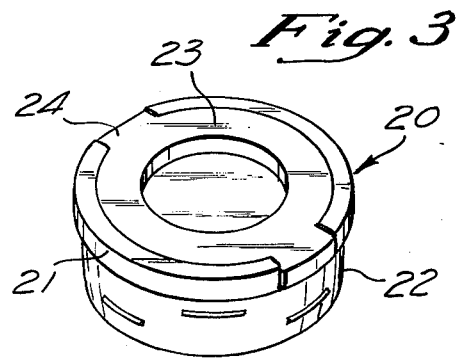
FIG. 3 is a view similar to FIG. 2 but with the tab in a fully closed position.
Figure 2:
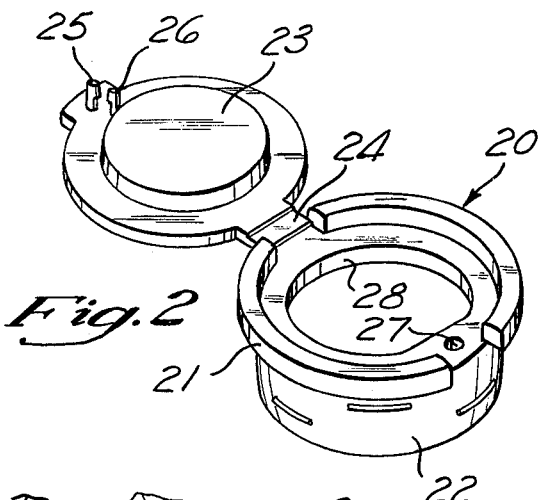
FIG. 2 is a perspective view of an end closure which is molded in the machine shown in FIG. 1, with the recloseable tab of the end closure shown in its molded open position.

Referring now to FIGS. 2 and 3 of the drawings, an end closure article 20 which is produced by the machine shown in FIG. 1 is shown. The structural details of the end closure article 20 are disclosed in U.S. Pat. application Ser. No. 673,073, filed Apr. 2, 1976, the entirety of which is incorporated herein by reference. The end closure article 20 includes a base 21 having a skirt portion 22 which is received in a cylindrical container (not shown) for dispensing a product. A recloseable tab 23 is secured to the base 21 by a reduced thickness hinge portion 24. The recloseable tab 23 includes two undercut pins 25 and 26. The undercut pin 25 is received in a through hole 27 in the base 21, and the pin 26 is received in the dispensing opening 28 through which the contents of the container (not shown) to which the end closure article 20 is attached is dispensed. The undercut of the pins 25 and 26 provides a detent in the fully closed position shown in FIG. 3 which holds the recloseable tab 23 closed.

The end closure article 20 is injection moled in its open position shown in FIG. 2. The end closure article 20 is a one piece integral product preferably made of a relatively soft polypropylene but alternatively made of polyethylene or any other suitable common thermoplastic material which may be readily selected by those skilled in the art. Before the end closure article 20 is ejected from the injection molding machine, the recloseable tab 23 is rotated about the hinge 24 from the fully open molded position shown in FIG. 2 to the fully closed position shown in FIG. 3, as more fully described below.

Figure 4:
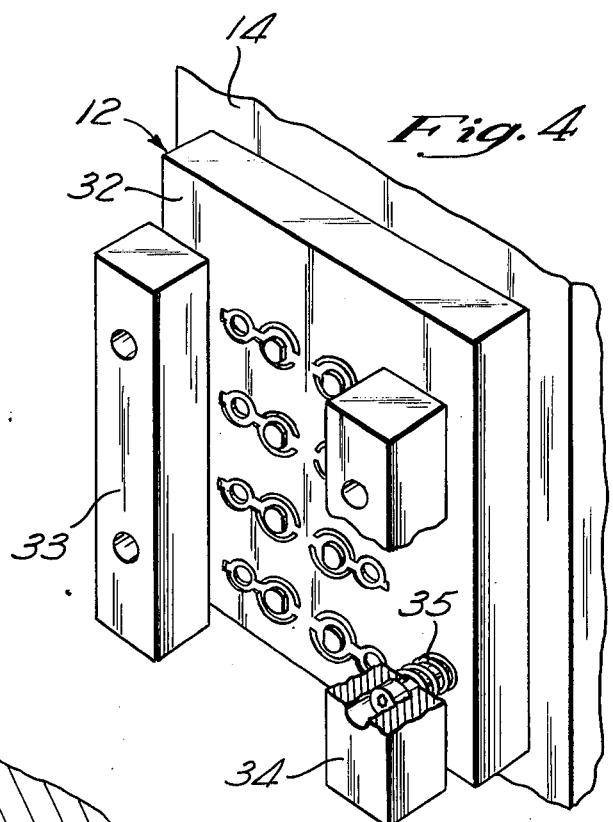
FIG. 4 is a perspective view of the stationary mold half for the machine shown in FIG. 1, with two tab lifters each shown in an open position and with one of the tab lifters broken away in part for clarity.

Referring now to FIG. 4, the stationary mold half 12 is shown in greater detail. The stationary mold half 12 is provided with eight cavity portions each of which define all of the upwardly facing surfaces of the end closure article 20 as viewed in FIG. 2. The configuration of each cavity portion formed in the flat surface 32 of the stationary mold half 12 may also be seen by reference to FIGS. 5 and 9.

Still referring to FIG. 4, the stationary mold half 12 also includes two rectangular tab lifters 33 and 34. The tab lifters 33 and 34 are each slidably mounted by two bolts which are threaded into the stationary mold half 12. The tab lifters 33 and 34 are each spring biased away from the front face 32 of the stationary mold half 12 by two suitable coil springs 35 which are concentrically disposed on the bolts. The two holes in each of the tab lifters 33 and 34 which receive the bolts include a smaller diameter portion and a larger diameter portion which form a shoulder at their junction to provide a stop which acts against the head of the bolt so that the springs 35 cannot push the tab lifters 33 and 34 off of the bolts.

Figure 5:
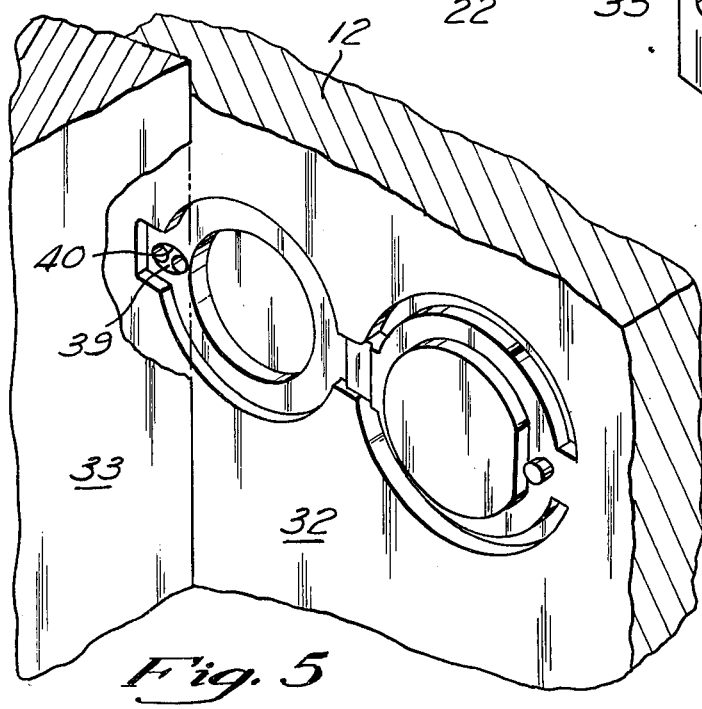
FIG. 5 is an enlarged view of a portion of the stationary mold half, but with the tab lifter shwon in a closed position.

The tab lifters 33 and 34 are moved from their spring biased positions shown in FIG. 4 to positions against the front face 32 of the stationary mold mold half 12 when the stationary mold half 12 is in its molding position as explained further below. When the tab lifters 33 and 34 are in this position against the front face 32, as illustrated in FIG. 5, the lifters each define a portion of the tab 23 which faces downwardly when the end closure article 20 is open as viewed in FIG. 2. The purpose and operation of the tab lifters 33 and 34 are explained further below.

Figure 6:
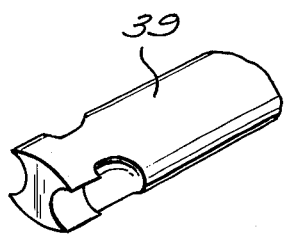
FIG. 6 is an enlarged perspective view of a core pin used in the stationary mold half.

As shown in FIGS. 5, 6 and 9 the stationary mold half 12 also includes a cavity pin 39 which is slidably disposed in an oval opening 40 which extends from the front face 32 of the stationary mold half 12 in the longitudinal direction. The cavity pin 39 and oval opening 40 define the undercut pins 25 and 26 of the end closure article 20. After the end closure article 20 is injection molded as shown in FIG. 9, the cavity pin 39 is pulled away from the pins 25 and 26 as explained further below.

Referring now to FIGS. 7 and 8, the movable mold half 11 is shown in greater detail. The movable mold half 11 includes a flat front face 47. Eight cavity portions, one of which is shown in detail in FIG. 8, extend longitudinally into the stationary mold half 11 from the front face 47. Each of the eight cavity portions of the movable mold half 11 cooperate with one of the eight cavity portions of the stationary mold half 12 shown in FIG. 4 and described above to provide a mold cavity which defines the end closure article 20. Each of the eight cavity portions of the movable mold 11 define all of the surfaces of the end closure article 20 which face downwardly as the article 20 is viewed in FIG. 2, with the exception of those downwardly facing portions of the article 20 which are defined by the tab lifters 33 and 34 of the stationary mold half as discussed above. The respective portions of the end closure article 20 which are defined by the movable mold half 11 and by the stationary mold half 12 are illustrated in FIG. 9.

As best shown in FIGS. 8 and 9, the movable mold half 11 includes a stripper plate 41 and eight cylindrical cores 42. Each of the cores 42 include four ejector pins 43. The function and operation of the stripper plate 41 and cores 42 during the operation of the machine are explained below. As also explained below, the rectangular recesses 48 and 49 extend from the front face 47 for receiving the two tab lifters 33 and 34 respectively when the movable mold half 11 is in the molding position.

The movable mold half 11, as shown in FIG. 7, is also provided with two laterally extending T-shaped slots 51. Two tab closing roller carriers 52 are slidably disposed in the T-shaped slots 51 for lateral movement between a retracted position spaced laterally outwardly from the recesses 48 and 49 when the movable mold half 11 is in its molding position adjacent the stationary mold half 12, and a tab closing position described below when the movable mold half 11 is in its ejecting position spaced away from the stationary mold half 12. Each of the roller carriers 52 includes two T-shaped side rails 53 which are slidably disposed in the slots 51 and which are joined together by a connecting bar 54. An air actuated pneumatic cylinder 55 has a cylinder portion secured to the bed plate (not shown) of the injection molding machine and a movable rod portion secured to the connecting bar 54 to move the roler carrier 52 laterally back and forth between its retraced position and its tab closing position.

Each of the roller carrier side rails 53 is provided with a longitudinally extending slotted opening 56. A one piece steel tab closing surface or roller 57 is provided with reduced diameter end portions which are rotatably received in the slotted openings 56. The rollers 57 are each provided with four spaced apart annular grooves in which elastomeric O-rings 58 are disposed. Two camming plates 59 are welded to the front face 47 of the movable mold half 11. The camming plates 59 each include a flat inclined camming surface 60 which extends in both the lateral and longitudinal directions to act on the reduced diameter end portions of the rollers 57 when the rollers 57 are moved laterally inwardly to effect longitudinal movement of the rollers 57 near the end of their stroke as described more fully below.

Referring now to FIGS. 9, 10 and 11, the operation of the injection molding machine will now be explained. Although the operation of the machine will be explained with reference to only one of the mold cavities, eight end closure articles are produced with each stroke of the machine by the eight identical mold cavities which are cooperatively defined by the movable and stationary halves 11 and 12.

At the initiation of a cycle of the injection molding machine, the movable mold half 11 is in the ejecting or open position shown in FIG. 1. When the movable mold half 11 is in this position, the tab closing rollers 57 (FIG. 7) are each disposed in a retracted position laterally outside of the recesses 48 and 49. The hydraulic ram 16 (FIG. 1) acts to move the movable mold half 11 along the longitudinal axis 15 to the right as viewed in FIG. 1. As the front face 47 of the movable mold half 11 approaches the front face 32 of the stationary mold half 12, the spring biased tab lifter 33 enters the recess 48. The longitudinal depth of the recess 48 is equal to the longitudinal thickness of the lifter 33, so that the tab lifter 33 engages the bottom of the recess 48. Further movement of the movable mold half 11 toward the stationary mold half 12 compresses the springs 35 which normally bias the tab lifter 33 away from the front face 32 of the stationary mold half 12 (FIG. 4). At the end of the movement of the movable mold half 11 toward the stationary mold half 12, the front face 47 of the movable mold half 11 engages the front face 32 of the stationary mold half 12, and the tab lifter 33 engages the front face 32 of the stationary mold half 12. This is the fully closed or molding position of the movable mold half 11 and is illustrated in FIG. 9.

When the movable mold half 11 is in the molding position, the stationary and movable mold halves cooperatively define a mold cavity for the end closure article 20. Thermoplastic material at a sufficiently high temperature as to flow under pressure is then injected into the mold cavity to form the end closure article 20 having the recloseable tab 23 in an open position relative to the base 21. The thermoplastic material is then cooled sufficiently that it will retain its dimensional stability but is not fully cooled to ambient temperature.

Referring still to FIG. 9, the mold cavity which defines the article 20 is then opened. The movable mold half 11 including the stripper plate 41 and the core 42, together with the tab lifter 33 and the core pin 39, move together to the left away from the end face 32 until the undercut pins 25 and 26 are removed from the oval opening 40. The movement of the undercut pin 39 to the left then terminates so that further movement of the end closure article 20 and undercut pins 25 and 26 to the left frees the undercut pins 25 and 26 from the core pin 39.

After the undercut pins 25 and 26 are pulled from the core pin 39, the core 42 moves to the left approximately one eighth inch relative to the stripper plate 41. This strips the core 42 from the end closure article 20 and provides a space beneath the dispensing opening 28 and hole 27 into which the pins 26 and 25, respectively, project when the tab 23 is closed as described further below.

As the movable mold half 11 (including both the stripper plate 41 and the core 42) continues to move to the left as viewed in FIG. 9 away from the stationary mold half 12, the springs 35 which bias the tab lifter 33 away from the front face 32 of the stationary mold half 12 retain the tab lifter 33 in the recess 48 of the movable mold half 11. When the movable mold half 11 has moved sufficiently far to the left as viewed in FIG. 9 that the heads of the bolts which secure the tab lifter 33 to the stationary mold half 12 engage the shoulder formed in the stepped bore in their associated holes in the tab lifter 33, further movement of the movable mold half 11 begins to pull the tab lifter 33 out of the recess 48.

Because the front face 47 of the movable mold half 11 has moved away from the front face 32 of the stationary mold half 12 when this occurs, the now stationary tab lifter 33 rotates the recloseable tab 23 about the hinge 24 and thereby moves the recloseable tab 23 out of the movable mold half 11. Continued movement of the movable mold half 11 rotates the recloseable tab 23 from its open molded position to a partially closed position, as shown in FIG. 10. When this occurs, and before the tab 23 moves sufficiently far to the left that it is released from the tab lifter 33, the tab closing roller 57 moves laterally inwardly to engage the tab 23 in the manner shown in FIG. 10. This laterally inward movement of the tab closing roller 57 occurs by operation of the pneumatic cylinder 55, which is supplied with air under pressure when the movable mold half 11 has moved a predetermined distance away from the stationary mold 12.

As the tab closing roller 57 is moved laterally further across the front face 47 of the movable mold half 11, the elastomeric O-ring 58 of the roller 57 continues moving the recloseable tab 23 toward a fully closed position. As the roller 57 approaches the end of its lateral stroke, the camming surfaces 60 (FIG. 7) acting on the two reduced diameter end portions of the roller 57 force the roller 57 longitudinally in a direction toward the front face 47. This longitudinal movement of the roller 57 causes the O-ring 58 to move the recloseable tab 23 to its fully closed position in which the detent provided by the undercut pins 25 and 26 holds the tab 23 securely in its fully closed position. This laterally and longitudinally extending position of the roller 57 is illustrated in FIG. 11.

After the recloseable tab 23 of the end closure article 20 in the movable mold 11 has been moved to the fully closed position by operation of the roller 57, the roller 57 is moved laterally back to its retracted position laterally outside the recess 48. The ejector pins 43 in the core 42 then push the completed end closure article 20 out of the movable mold half 11 to complete the cycle of the machine.

The end closure article 20 is then fitted on the end of a container which has been filled with a product to be dispensed without requiring an additional operation of the end closure article to close the tab 23. Additionally, because the tab 23 is closed while the end closure article is still in the open mold cavity, any possibility of the undercut pins 25 and 26 being misaligned with the hole 27 and dispensing opening 28, respectively, due to dimensional changes as the end closure article further cools to ambient temperature is eliminated.

What is claimed is:

1. An injection molding machine comprising a stationary mold half, a movable mold half, means for moving said movable mold half along a longitudinal axis relative to said stationary mold half between a molding position adjacent said stationary mold half and an ejecting position spaced from said stationary mold half, said stationary mold half and said movable mold half cooperatively defining a mold cavity when said movable mold half is in said molding position, said mold cavity defining an end closure article having a base and a recloseable tab disposed in an open position relative to said base and connectable friction means on said base and said tab for holding said tab in a closed position relative to said base when said tab is fully closed, means for fully closing said tab and connecting said friction means of said molded plastic article before ejecting said article from one of said stationary and movable mold halves, and means for ejecting said molded plastic article from said one of said mold halves after said full closing of said tab, said means for fully closing said tab including a closing surface and actuator means for moving said closing surface laterally between a retracted position spaced from said mold cavity when said movable mold half is in said molding position and an operating position engaging said tab when said movable mold half is moved away from said molding position by said moving means.

2. An injection molding machine as set forth in claim 1, wherein said actuator means includes means for moving said closing surface longitudinally.

3. An injection molding machine as set forth in claim 1, wherein said stationary mold half includes a cavity portion, said movable mold half includes a cavity portion, said cavity portions cooperatively define said mold cavity when said movable mold half is in said molding position, said movable mold half includes a longitudinally extending recess adjacent said movable mold half cavity portion, said stationary mold half includes a tab lifter disposed in said recess when said movable mold half is in said molding position and disposed away from said recess when said movable mold half is in said ejecting position.

4. An injection molding machine as set forth in claim 3 wherein said tab lifter defines a portion of said mold cavity.

5. An injection molding machine as set forth in claim 3 including mounting means mounting said tab lifter on said stationary mold half, and said mounting means includes spring means biasing said tab lifter toward said movable mold half.

6. An injection molding machine comprising a stationary mold half having a first cavity portion, a movable mold half having a second cavity portion, means for moving said movable mold half along a longitudinal axis relative to said stationary mold half between a molding position adjacent said stationary mold half and an ejecting position spaced from said stationary mold half, said first and second cavity portions cooperatively defining a mold cavity when said movable mold half is in said molding position, said mold cavity defining an end closure article having a base and a recloseable tab disposed in an open position relative to said base and connectable detent means on said base and said tab for holding said tab in a closed position relative to said base when said tab is fully closed, means for fully closing said tab and connecting said detent means of said molded plastic article before ejecting said article from one of said first and second cavity portions, and means for ejecting said molded plastic article from said one of said cavity portions after said full closing of said tab, said means for fully closing said tab including a closing surface and actuator means for moving said closing surface laterally between a retracted position spaced from said mold cavity when said movable mold half is in said molding position and an operating position engaging said tab when said movable mold half is moved away from said molding position by said moving means.

7. An injection molding machine as set forth in claim 6, wherein said closing surface is a roller, and said machine further includes cam means for moving said roller longitudinally.

8. An injection molding machine as set forth in claim 6, wherein said movable mold half includes a longitudinally extending recess adjacent said second cavity portion, said stationary mold half includes a tab lifter disposed in said recess when said movable mold half is in said molding position and disposed away from said recess when said movable mold half is in said ejecting position.

9. An injection molding machine as set forth in claim 8, wherein said tab lifter includes a portion defining said mold cavity.

10. An injection molding machine comprising a first mold half having a first cavity portion and an article lifter, a second mold half having a second cavity portion and a longitudinally extending recess adjacent said second cavity portion, means for moving said second cavity portion along a longitudinal axis relative to said first cavity portion between a molding position adjacent said first cavity portion and an ejecting position spaced from said first cavity portion, said article lifter being disposed in said recess when said second cavity portion is in said molding position and being disposed away from said recess when said second cavity portion is in said ejecting position, said first and second cavity portions and said article lifter cooperatively defining an article having a base and a recloseable tab disposed in an open position relative to said base when said second cavity portion is in said molding position, means for removing said tab from said second cavity portion when said second cavity portion is moved from said molding position toward said ejecting position, said means for removing including said article lifter, means for fully closing said tab including a closing surface and actuator means for moving said closing surface laterally between a retracted position spaced form said mold cavity when said movable mold half is in said molding position and an operating position engaging said tab when said movable mold half is moved away from said molding position by said moving means, and means for ejecting said article from said second mold half after said full closing of said tab.

11. An injection molding machine as set forth in claim 10, including mounting means mounting said article lifter on said first mold half, and said mounting means includes spring means biasing said article lifter toward said second mold half.

* * * * *

UNITED STATES PATENT AND TRADEMARK OFFICE
CERTIFICATE OF CORRECTION

PATENT NO. : 4,040,595
DATED : August 9, 1977
INVENTOR(S) : Charles Tecco

It is certified that error appears in the above-identified patent and that said Letters Patent are hereby corrected as shown below:

Column 1, line 63, please change "shwon" to --shown--.

Column 2, line 25, after "molding" please insert --machine--.

Column 3, line 6, after "flat" please insert --front--.

Column 3, line 29, after "5, the" please insert --tab--.

Column 4, line 59, after "of the" please insert --tab--.

Column 6, line 21, please change "of" to --on--.

Claim 10, column 8, line 33, please change "form" to --from--.

Signed and Sealed this

First Day of November 1977

[SEAL]

Attest:

RUTH C. MASON
*Attesting Officer*

LUTRELLE F. PARKER
*Acting Commissioner of Patents and Trademarks*